Figure 1:
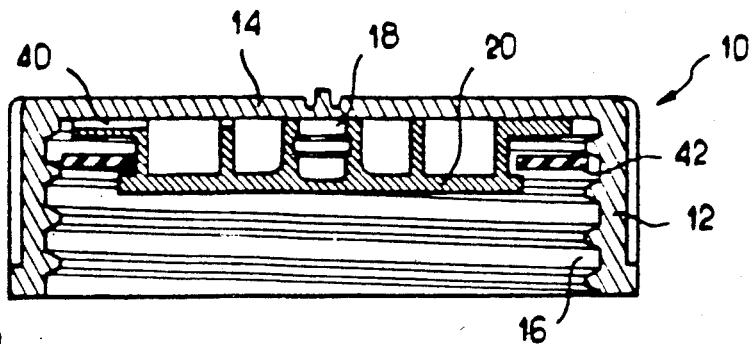

United States Patent [19]

Côme et al.

[11] Patent Number: 4,666,057
[45] Date of Patent: May 19, 1987

[54] CAP FOR A RESERVOIR

[75] Inventors: Philippe Côme, Senlis; Raphael Aires, Paris, both of France

[73] Assignee: Bendix France, Paris, France

[21] Appl. No.: 851,602

[22] Filed: Apr. 14, 1986

[30] Foreign Application Priority Data

Apr. 24, 1985 [FR] France ............................. 85 06211

[51] Int. Cl.[4] .................................................. B65D 51/16
[52] U.S. Cl. ..................................... 220/368; 220/374
[58] Field of Search ................................. 220/368, 374

[56] References Cited

U.S. PATENT DOCUMENTS 3,041,837  7/1962  Jacoby .............................. 220/368
3,286,873  11/1966  Tuckey .............................. 220/374
4,036,386  7/1977  Nishioka et al. .................. 215/260

FOREIGN PATENT DOCUMENTS 2115528  9/1983  United Kingdom .

Primary Examiner—George T. Hall
Attorney, Agent, or Firm—Larry J. Palguta; Ken C. Decker

[57] ABSTRACT

Cap for a reservoir (10), intended to be mounted on a reservoir having an external thread, of the type comprising an internal thread (16), a sealing gasket (42) and a labyrinth means (20) in a fluid passage between the threads and the inside of the cap, characterized in that the labyrinth means (20) comprises at least one intermediate accumulation chamber (34, 36) in the passage.

7 Claims, 5 Drawing Figures

CAP FOR A RESERVOIR

The present invention relates to caps for reservoirs and more particularly to such a cap for a reservoir for the fluid of a master cylinder.

It is necessary that a cap for a reservoir be able to pass air freely from the inside of the reservoir to the atmosphere, for example, during variations in the level of hydraulic fluid in the reservoir. It is also important that the cap should prevent the entry of contaminating agents, particularly external liquids such as water, into the reservoir.

A cap for a hydraulic fluid reservoir is known from the document FR-A-2,521,934 which incorporates a valve arrangement and in which the inlet and outlet passages are situated in the thread between the cap and the body of the reservoir. The cap has disadvantages in that it requires several components and in that, if the reservoir is subjected to heavy shocks, it is possible that hydraulic fluid may escape through the thread.

The object of the invention is therefore to provide a cap for a reservoir which is of simple construction and in which the risk of contaminating agents entering, or of hydraulic fluid escaping, are reduced.

According to the invention, there is provide a cap for a reservoir which is intended to be mounted on a reservoir having an external thread, of the type comprising an internal thread, a sealing gasket and labyrinth means in a fluid passage between the threads and the inside of the cap, characterized in that the labyrinth means comprises at least one intermediate accumulation chamber in the passage.

Figure 2:
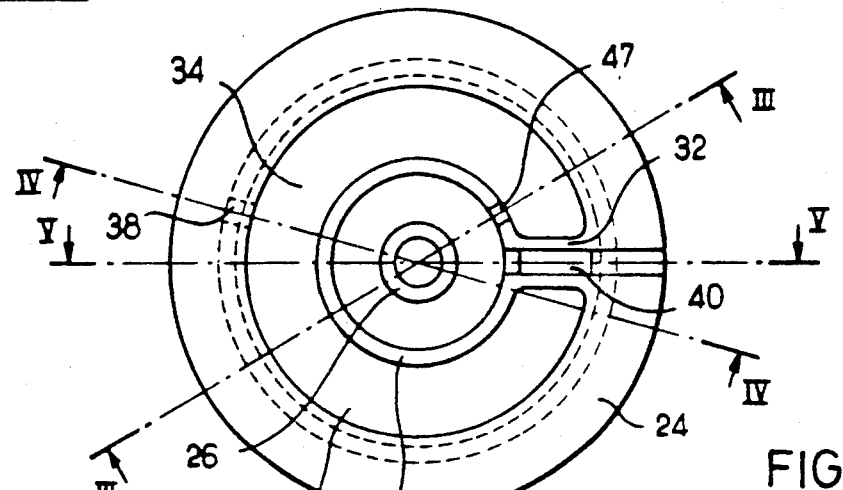
Figure 3:
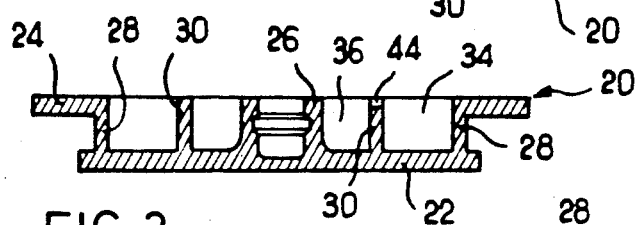
Figure 4:
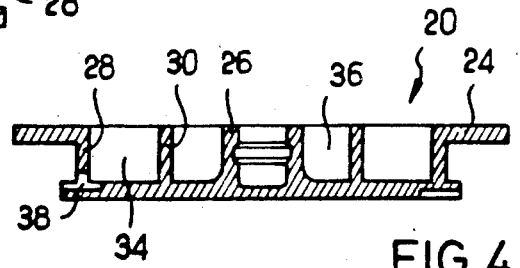
Figure 5:
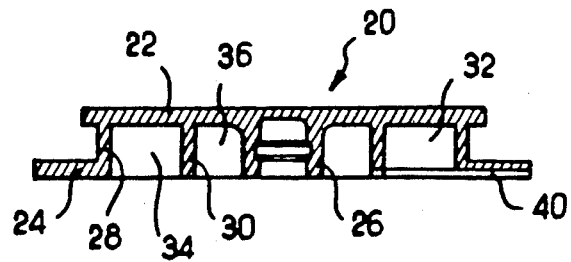

Other characteristics and advantages of the present invention will emerge from the following description of an embodiment which is given by way of illustration, but is not limiting in any way, with reference to the accompanying drawings, in which:

FIG. 1 is longitudinal sectional view of a cap for a reservoir according to the invention;

FIG. 2 is a plan view of the labyrinth structure of the cap shown in FIG. 1; and FIGS. 3, 4, and 5 are longitudinal sectional view through the lines 3—3, 4—4 and 5—5 shown in FIG. 2.

As shown in FIG. 1, the cap for a reservoir 10 incorporates a generally cylindrical wall 12 and a circular bottom 14. The wall 12 has a thread 16 for mounting the cap on the body of a reservoir (not shown). The cap comprises at the center of the bottom 14 a projection 18 which is inserted into a labyrinth structure 20.

As may be seen more clearly in FIGS. 2 to 5, the labyrinth structure 20 comprises a bottom 22 which is generally circular, an annular collar 24 and a hub 26 through the intermediary of which the labyrinth 20 is mounted on the projection 18. The labyrinth structure 20 has two walls which are generally annular and which advantageously are concentric 28, 30 which, together with a radial bulkhead 32 define a first external chamber 34 which is generally annular. A second internal chamber 36 which is generally annular is defined between the internal wall 30 and the hub 26. When the cap is in position the first chamber 34 communicates with the inside of the reservoir (not shown) through a small opening 38 (see FIG. 4) between the wall 28 and the bottom 22. In the same way, the second chamber 36 communicates with the thread 16 between the cap and the body of the reservoir through a small passage 40 which is formed in the bulkhead 32 and the annular collar 24 (see FIG. 5). When the cap is mounted on the reservoir an annular seal 42 isolates the passage 40 from the inside of the reservoir, and thus the only possible passage between the inside of the reservoir and the atmosphere is formed by the intermediary of the opening and the passage 38 and 40, via the chambers 34 and 36.

The wall 30 between the first and second chambers has an overflow opening 44 (see FIG. 3) whose function is described below.

The passage of air between the inside of the reservoir and the atmosphere occurs through the opening 38, the first and the second chambers 34, 36 through the intermediary of the overflow opening 44, the passage 40 and the thread 16 between the cap 10 and the reservoir. On the other hand owing to the shape of the labyrinth, the possibility of the hydraulic fluid escaping from the reservoir is reduced to a minimum, given that when it is subjected to shock, the escaping hydraulic fluid must first fill the first chamber 34 through the opening 38, and then only once this chamber is full, pass through the overflow opening 44 into the second chamber 36, so that it is only when the second chamber 36 is in turn filled that the hydraulic fluid can flow through the passage 40 towards the thread 16 and the outside of the reservoir. Given that the opening 38 is situated at the bottom of the first chamber, it is most unlikely that the latter will become full.

In the same way, the entry of contaminating agents into the inside of the reservoir is prevented by the shape of the labyrinth structure 20.

It is understood that the shapes of the labyrinth could be different from that shown in the Figures. The first and second chambers 34, 36 could be other than concentric and could have another shape, for example, semicircular or polygonal. Even the labyrinth structure may be constructed of various different components during manufacture of the cap.

We claim:

1. A cap for a reservoir, intended to be mounted on a reservoir having an external thread, of the type comprising an internal thread, a sealing gasket and labyrinth means in a fluid passage between the threads and an interior of the cap, characterized in that the labyrinth means comprises at least an intermediate accumulation chamber in the passage, and another chamber in the passage, in series with the accumulation chamber.

2. The cap for a reservoir according to claim 1, characterized in that the chambers communicate with one another through an overflow opening.

3. The cap for a reservoir according to claim 2, characterized in that one of the chambers communicates with the threads through a high-level passage, and the other of the chambers communicates with an interior of the reservoir through a low-level passage.

4. The cap for a reservoir according to claim 3, characterized in that the chambers are generally concentric.

5. The cap for a reservoir according to claim 3, characterized in that the overflow opening and high- and low-level passages, relative to a center of the cap, are angularly offset from one another.

6. The cap for a reservoir according to claim 3, characterized in that the high-level passage and the low-level passage, relative to a central point of the cap, are angularly offset from one another.

7. The cap for a reservoir according to claim 6, characterized in that the labyrinth means is connected with the cap by means of a cap projection which couples with the labyrinth means.

* * * * *